(12) United States Patent
Demetropoulos et al.

(10) Patent No.: US 6,258,588 B1
(45) Date of Patent: Jul. 10, 2001

(54) PALMARIA ALGAL STRAINS AND METHODS FOR THEIR USE

(75) Inventors: Carl L. Demetropoulos, Moorpark, CA (US); Christopher J. Langdon, Newport, OR (US)

(73) Assignees: Oregon State University, Corvallis, OR (US); Big Island Abalone Corporation, Friday Harbor, WA (US)

( * ) Notice: Subject to any disclaimer, the term of this patent is extended or adjusted under 35 U.S.C. 154(b) by 0 days.

(21) Appl. No.: 09/479,397

(22) Filed: Jan. 6, 2000

(51) Int. Cl.$^7$ ................. C12N 1/12; C12N 1/00

(52) U.S. Cl. ........................... 435/257.1; 435/243

(58) Field of Search ................. 435/257.1, 243, 435/257.2, 257.3, 257.4, 257.5

(56) References Cited

PUBLICATIONS

Polyculture of Red Abalone, *Haliotis rufescens*, and Dulse, *Palmaria mollis,* Under Reduced Flow Conditions and Artificial Illumination; Journal of Shellfish Research, Abstracts pp. 324–325, 1998.*

Evans et al., Polyculture of *Halioits Rufescens* and *PalMaria Mollis* Under Reduced Flow Conditions and Artificial Illumination (Abstract), 51$^{st}$ Annual Meeting of the Pacific Coast Oyster Growers Association, National Shellfisheries Association (Pacific Coast Section), Newport, Oregon, Sep. 23–25, 1997.

* cited by examiner

*Primary Examiner*—Christopher R. Tate
*Assistant Examiner*—Patricia D Patten
(74) *Attorney, Agent, or Firm*—Klarquist Sparkman Campbell Leigh & Whinston, LLP

(57) ABSTRACT

Palmaria cultivars having a growth rate greater than wild type and known strains, particularly when cultured at temperatures greater than about 16° C., and specific embodiments of such cultivars, many of which had a rosette morphology, are described. Methods for isolating such cultivars and using the cultivars as a food source also are described. One embodiment of the method for isolating such cultivars comprised providing at least one sample of Palmaria and cultivating such sample in a container under environmental conditions to produce at least one Palmaria cultivar having a growth rate greater than wild type when cultured at temperatures greater than about 16° C. A particular embodiment of the method resulted in the isolation of Palmaria cultivars having a rosette morphology. Isolated Palmaria cultivars can be used as a food source for feeding organisms, such as humans. A particular embodiment of the method for using the cultivars as a food source comprised feeding the cultivars to abalone, including co-culturing the Palmaria cultivars with abalone.

17 Claims, 8 Drawing Sheets

PALMARIA ALGAL STRAINS AND METHODS FOR THEIR USE

FIELD

The present invention concerns strains of algae, such as Palmaria cultivars having a growth rate and temperature tolerance greater than wild type algae, including Palmaria cultivars having a rosette morphology. The described Palmaria cultivars are useful for a variety of purposes including, but not limited to, feeding organisms. Methods for isolating and culturing these cultivars also are described and claimed.

BACKGROUND

Red macroalgae of the genus Palmaria generally are reddish brown in color with broad, flattened fronds. The fronds arise from a base, usually with a small stipe, and gradually expand to form simple or palmately divided fronds, often with marginal leaflets. The shape of wild type Palmaria fronds can vary from broad ovals to narrow linear segments, though the most common shape is the characteristic palmate form with branching finger-like extensions.

*Palmaria palmata*, a particular Palmaria species, is a popular ingredient in natural cosmetics and skin care products and also is widely used for food. The species is not particularly palatable when fresh but, if dried carefully and rapidly, is one of the few seaweeds that tastes good. *Palmaria palmata* is popular in coastal communities of the North Atlantic, particularly Ireland, Scotland, Iceland, Norway, France and Eastern Canada.

Though popular as a human food, Palmaria traditionally has not been used for aquaculture—the agricultural production of marine and freshwater organisms—which is an important and growing industry in the United States. Crustaceans, fish, and shellfish offer a high-protein food source as an alternative to beef, pork, and chicken products. While aquaculture production of crustaceans (such as shrimp and crawfish) or fish (such as baitfish or catfish) is a long-established industry, recent attention has been directed to the aquaculture of abalone.

Abalone is a gastropod, similar to oysters and clams, and is considered a gourmet delicacy. Aquaculture of abalone traditionally has been based on feeding abalone a diet of giant kelp (Macrocystis species) or bull kelp (*Nereocystis luetkeana*) harvested from wild kelp beds growing naturally in coastal areas. Giant and bull kelps are not an optimal abalone fodder (food source) for aquaculture operations, however. Like most marine algae, such kelps have relatively poor nutritional values and relatively high moisture contents, characteristics which make them poor food sources for abalone. Abalone consuming giant and bull kelps ingest a large amount of water and a low amount of usable food material, and thus exhibit relatively slow growth rates per amount of food consumed. For example, Ebert and Houk reported that bull kelp supports relatively slow abalone growth rates, typically a 30 to 60 $\mu$m shell length (SL) increase per day. *Abalone Cultivation Methods Used at the California Department of Fish and Game's Marine Resources Laboratory,* in HANDBOOK OF CULTURE OF ABALONE AND OTHER MARINE GASTROPODS, 242 (K. Hahn ed., 1989). These growth rate figures were later confirmed by Trevelyan et al., *Increasing the yield of red abalone with the alga, Microcladia coulteri,* 17 J. SHELLFISH RES. 631 (1998). Slow abalone growth rates and low feeding efficiency (rate of growth per amount of food consumed) of abalone decrease the economic efficiency and profitability of abalone aquaculture operations.

Even though kelps, such as giant and bull kelps, have poor nutritional value for abalone, their abundance in the abalone's natural habitat and the soft texture of their fronds may explain why they have been used as abalone fodder in aquaculture operations. P. E. McShane et al., *Factors influencing food selection in the abalone Haliotis rubra (Mollusca: Gastropoda),* 176 J. EXP. MAR. BIOL. ECOL. 27 (1994). The abalone aquaculture industry is also located particularly in Pacific coastal areas that support an abundance of giant and bull kelps suitable as abalone fodder. The geographic expansion of the abalone industry is limited to sites where such kelps can be easily harvested in sufficiently large quantities to support land-based and offshore abalone farms. E. E. Ebert, *Abalone aquaculture: a North America regional review,* in ABALONE OF THE WORLD 570 (S. A. Shepherd et al. eds., 1992). Additionally, governmental regulations and natural events, such as El Nino, affect the use, distribution, and availability of such kelps for harvest. J. P. Mercer et al., *General principles of on-shore cultivation of seaweeds: effects of light on production,* 221 HYDROBIOLOGIA 125 (1993); S. C. McBride, *Current status of abalone aquaculture in the Californias,* 17 J. SHELLFISH RES. 593 (1998); Ebert, (1992). For these reasons, the U.S. abalone aquaculture industry historically has been limited to the natural geographical locations of giant kelp (Macrocystis species) or bull kelp (*Nereocystis luetkeana*), primarily California. If a different food source for abalone were available, abalone aquaculture could spread geographically into other regions.

Moreover, commercial aquaculture operations must consider economic factors and comply with environmental regulations to harvest large quantities of kelp. For example, traditional land-based abalone farms maintain water quality via rapid water volume exchange rates, which flush abalone waste products (e.g. ammonia, nitrates, carbon dioxide, and dissolved organic wastes) from the culture system. These waste products must be processed into more environmentally benign materials to avoid polluting the environment. More environmentally sound aquaculture methods, or improved methods for controlling and processing abalone waste products, would therefore allow aquaculture operations to become more expansive and profitable.

SUMMARY

The present invention addresses the needs described above. Methods for isolating rapidly growing *Palmaria mollis* (dulse) strains for a variety of uses, including alternative food sources for humans and abalone, are described. The isolated strains have a growth rate greater than that of wild type Palmaria, and known strains of Palmaria, at a temperature of about 16° C. or greater. The rosette morphologies of certain strains provide a greater surface area to volume (SA/V ratio) than wild type Palmaria, and other known strains. This greater SA/V ratio exposes more of the algae to sunlight, thus allowing the strains of the present invention to be more photosynthetically active than the wild type or known strains, and exposes more of the algae to aquatic environments, thus allowing greater absorption of nutrients and organic carbon.

The greater SA/V ratio also exposes more of the alga's surface to the air, thus allowing more rapid evaporation of water from and desiccation of the alga. The Palmaria strains of the present invention can therefore be more rapidly dried for human consumption. Additionally, because of the rosette morphology, some strains have small, thin, leafy fronds, much like parsley (rather than having the large, thick fronds of the wild type Palmaria), which may make such strains more palatable for human consumption when fresh. The rapid growth rate also allows greater production of the claimed strains for use as food in aquaculture, such as in abalone aquaculture operations. Some isolated strains are capable of co-culturing with abalone, which aids in the elimination of abalone wastes, thus avoiding at least some costs of complying with environmental regulations.

Certain embodiments of the present invention comprise Palmaria algae having a growth rate greater than wild type Palmaria, or known strains, at a water temperature of 16° C. or greater, such as a specific growth rate of at least 8% per day at a stocking density (SD) under working conditions. The "working conditions" of the present invention are described in more detail below.

Particular *Palmaria mollis* strains having these characteristics have been isolated, including strains having a rosette morphology. Preferred Palmaria algae are reproductively sterile. An example of a particular *Palmaria mollis* strain having the desired characteristics has been isolated and deposited, including *Palmaria mollis* cultivar "OSU C-3," deposited with the Culture Collection of Algae and Protozoa (CCAP), Institute of Freshwater Ecology, The Windermere Laboratory, United Kingdom. The invention also includes strains derived from "OSU C-3," such as "BIAC C-$3_{GR}$" and "BIAC C-4."

These *Palmaria mollis* strains are useful as food sources for organisms, including humans and further including abalone. Because of their greater growth rate at temperatures more suitable for co-culturing with abalone (relative to the wild type and known strains), the *Palmaria mollis* strains of the present invention can be, but need not be, advantageously co-cultured with abalone at temperatures greater than about 16° C.

The present invention also provides methods for isolating a Palmaria cultivar having a growth rate greater than the wild type or known strains at a temperature of about 16° C. or greater. One embodiment of the method includes providing a container, culturing at least one sample of Palmaria in the container, and thereafter selecting at least one Palmaria cultivar having a growth rate greater than that of wild type or known strains at a temperature of about 16° C. or greater. The container can comprise a naturally occurring bounded water source, or a body of water into which a container is inserted. In working embodiments, the container typically was a tumble culture container. Where tumble culture containers were used, the tumbling rate of the Palmaria preferably was from about 1 to about 20 cm/sec, and the tumbling rate preferably was vigorous, such as from about 6 cm/sec to about 10 cm/sec. Photosynthetic rates and yields increase sharply above 5 cm per sec and show a positive linear relationship between about 5 and about 20 cm/sec. Practically, rates between about 6 and about 10 cm/sec were found to cover both the biological and economic needs of the culture.

A method for feeding an organism also is described. The method generally includes providing or isolating a *Palmaria mollis* cultivar having a growth rate greater than wild type or known strains at a temperature greater than 16° C. The *Palmaria mollis* were fed to an organism, such as a human or an abalone. The Palmaria cultivar and the organism may be co-cultivated, if desired.

DETAILED DESCRIPTION

I. Introduction

Figure 1A:
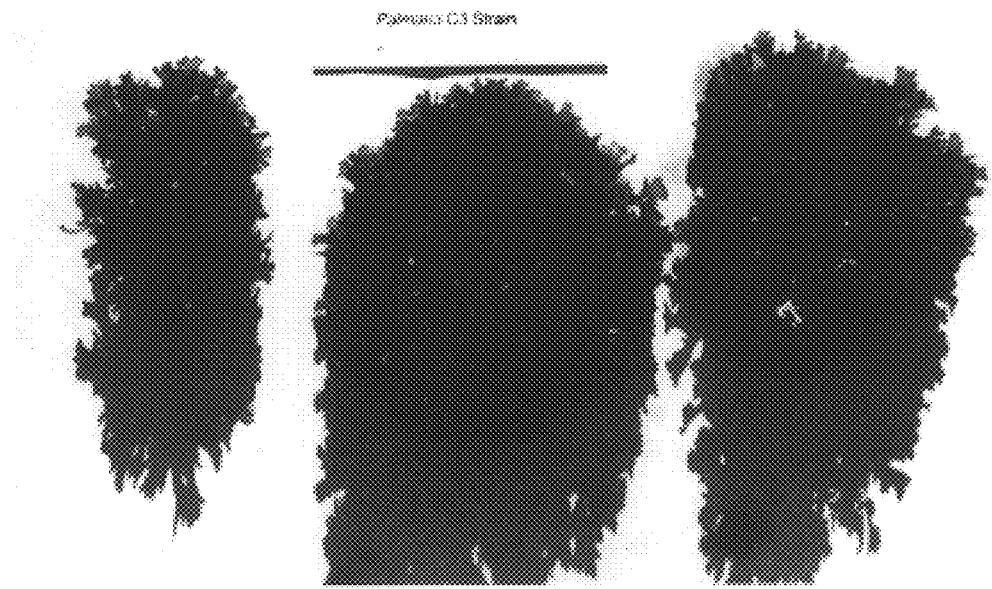
FIG. 1A is a photograph of Palmaria mollis "OSU C-3" strain.

Algae species, particularly marine macroalgae (seaweeds), are currently used for commercial and industrial applications, such as gourmet food products, aquaculture and agricultural applications, cosmetics, nutritional supplements, pharmaceuticals, biotechnology, and genetic engineering applications.

The present invention generally concerns algal strains having one or more of the following functional characteristics: (1) the algal strain has a growth rate greater than wild type or known strains when grown under the same environmental conditions; (2) the algal strain has a, greater growth rate than wild type or known strains when grown at a water temperature greater than about 16° C.; (3) the algal strain demonstrates a higher feeding efficiency with abalone than the traditional wild kelp abalone fodders, such as Macrocystis spp. or *Nereocystis luetheana*; (4) the algal strain has a rosette morphology, particularly a Palmaria alga having a rosette morphology; (5) Palmaria algal strains useful as food for organisms such as humans and abalone; and/or (6) non-reproductive sterility. Strains of Palmaria including, but not limited to, a strain named "OSU C-3" and its progeny are examples of algal strains having one or more of these characteristics. Methods for isolating and culturing strains having one or more of these characteristics, particularly *Palmaria mollis* (dulse) having rosette morphologies, and methods of using algal strains for feeding organisms including, but not limited to, feeding humans, feeding abalone, and co-culturing with abalone, also are described. Photographs of the "OSU C-3" strain and the "OSU C-4" strain are provided by FIGS. 1 & 2 respectively.

II. Algal Cultivars

One embodiment of the present invention concerns particular isolated, biologically pure *Palmaria mollis* cultivars. "Biologically pure" is understood to mean that the algal strain has been isolated from and cultivated independently of wild type or known strains of *Palmaria mollis*. The method of isolation and culturing described in Part III demonstrate one way of isolating the claimed strains.

Wild type *Palmaria mollis* has the following general characteristics: dull, reddish thalli; blades 20–92 cm in length, flattened and smooth, somewhat flaccid, simple or dichotomously branched to palmately lobed; divisions in blades are linear-lanceolate to broadly ovate in outline, 3 to 6 (20) cm wide. See Isabella A. Abbott and George J. Hollenberg, MARINE ALGAE OF CALIFORNIA (1976), 559.

*Palmaria mollis* cultivars of the present invention preferably have a growth rate and yield greater than that of the wild type *Palmaria mollis,* or known *Palmaria mollis* strains, such as the "Puget Sound" strain, when grown under the same environmental conditions. *Palmaria mollis* cultivars of the present invention typically have a specific growth rate of at least about 8% per day, and generally about 11.3%, when grown under working conditions at a water temperature of 16° C. or greater. "Working conditions are understood to include: (1) moderate light of about 50 to about 55 mol photons per square meter per day at the water surface; (2) sufficient amounts of macro and micro nutrients, such that the algae are not starved for nutrients; (3) a sufficient amount of inorganic carbon, such that the algae are not starved for inorganic carbon; and (4) a stocking density (SD) of about 8 grams per liter.

In comparison, wild type *Palmaria mollis* grown under the same conditions, have specific growth rates of less than about 4%.

Figure 3:
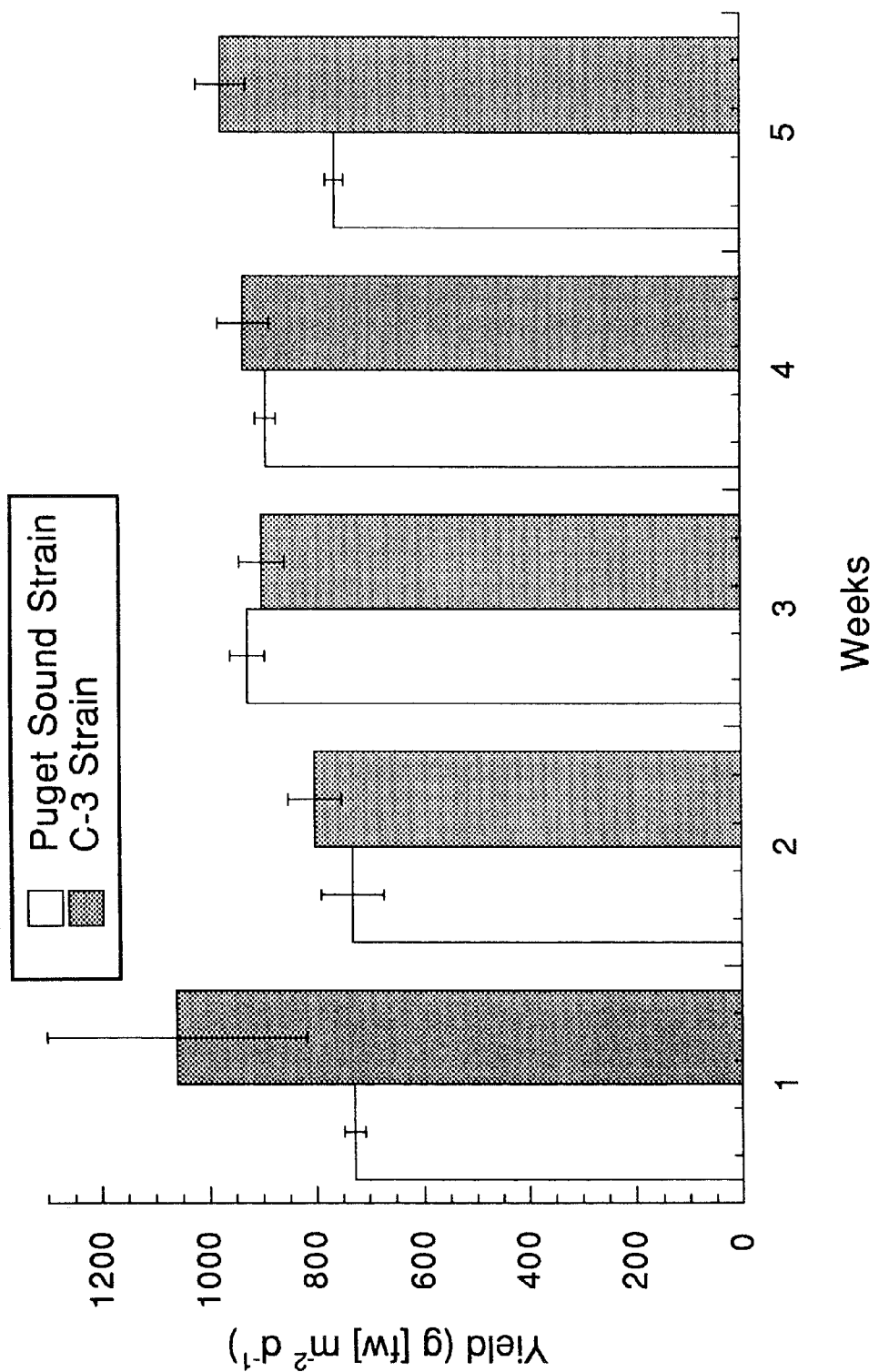
FIG. 3 is a graph comparing yields of a claimed strain and a previously known strain over time.

FIG. 3 illustrates the difference in growth rates between strains of the present invention and the known strains, such as the "Puget Sound" strain, and wild type *Palmaria mollis* by comparing yields of a strain of the present invention (the OSU C-3 strain) and the "Puget Sound" strain. The "Puget Sound" strain was isolated from wild type *Palmaria mollis* and differs from the wild type by being more epiphytic and having a slightly greater surface-area-to-volume (SA/V) ratio. Since the "Puget Sound" is closely related to wild type *Palmaria mollis,* a comparison of strains of the present invention with the wild type would show a similar, if not greater, difference in yields. The algal cultures of FIG. 3 were grown under working conditions at a temperature of 15.5° C.–16.5° C. Yields are expressed in grams (wet weight) per square meter per day, while time is designated by number of weeks.

Figure 4:
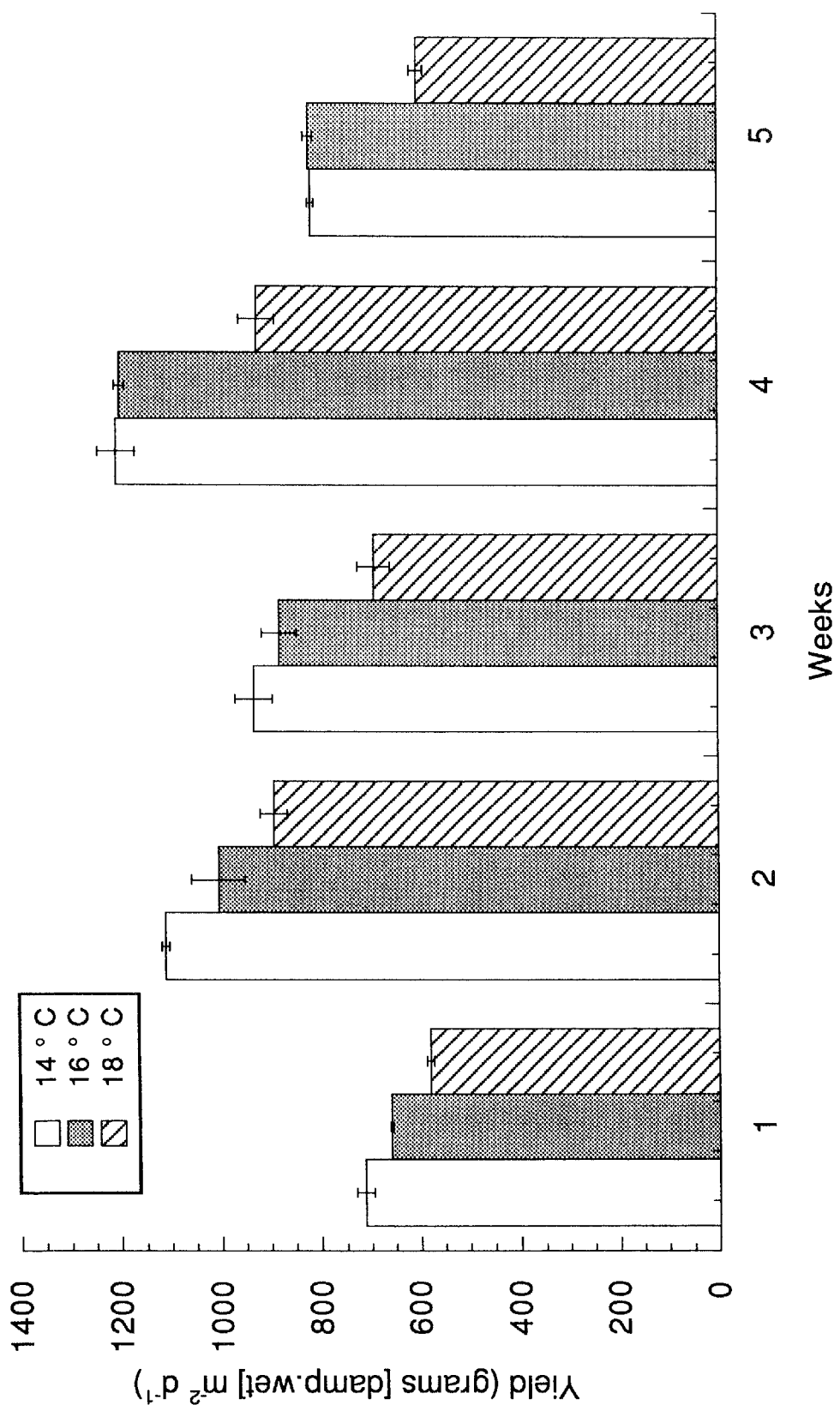
FIG. 4 is a graph illustrating yields of a claimed strain over time when grown at different temperatures.

The strains of the present invention are able to grow and produce yields at temperatures higher than wild type and known strains of *Palmaria mollis*. FIG. 4 shows that a claimed strain, a progeny strain of OSU C-3, can sustain yields even when grown at a temperature of 18° C.

Figure 1B:
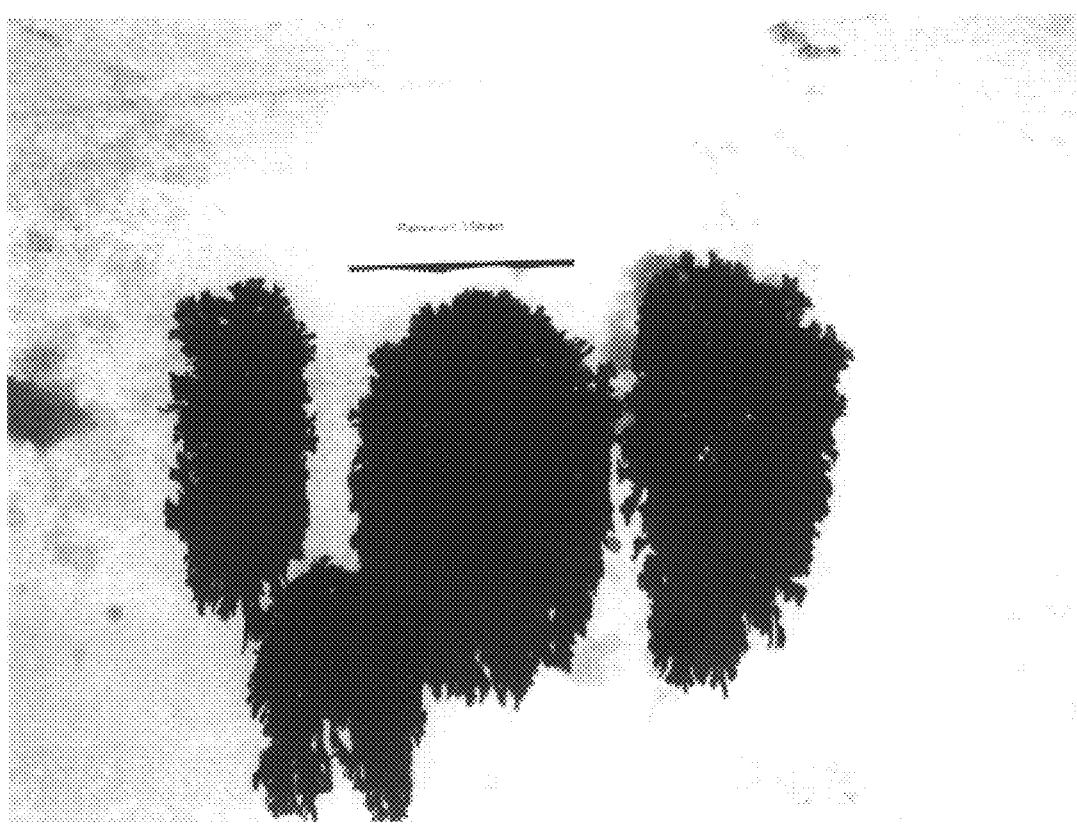
FIG. 1B is a photograph of Palmaria mollis "OSU C-3" strain.
Figure 2A:
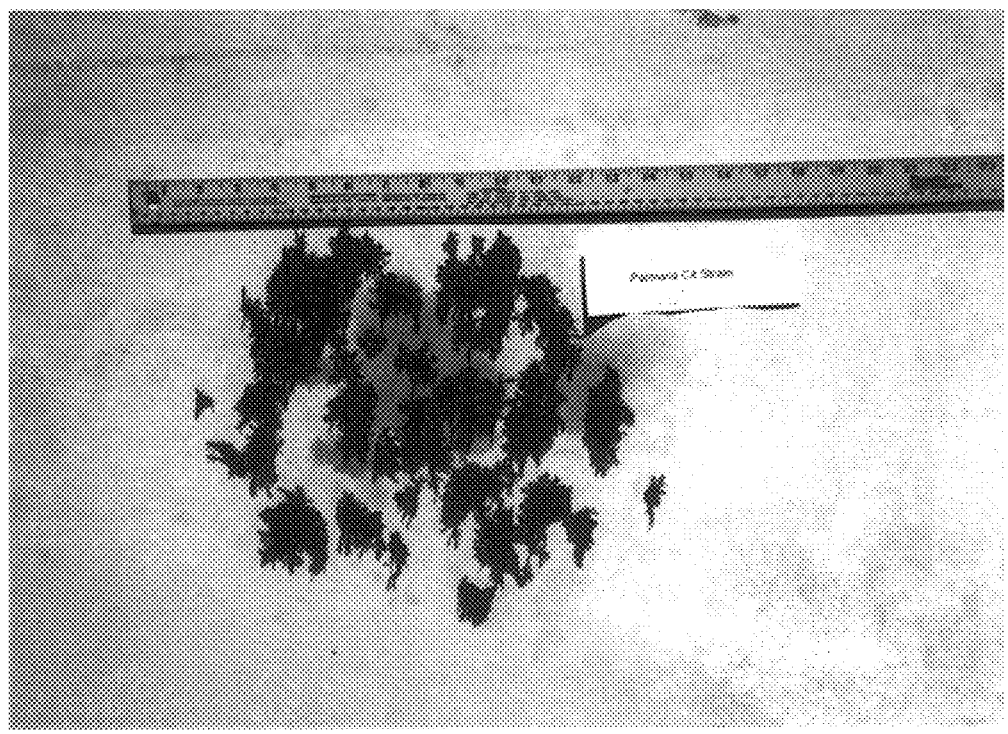
FIG. 2A is a photograph of Palmaria mollis "BIAC C-4" strain.
Figure 2B:
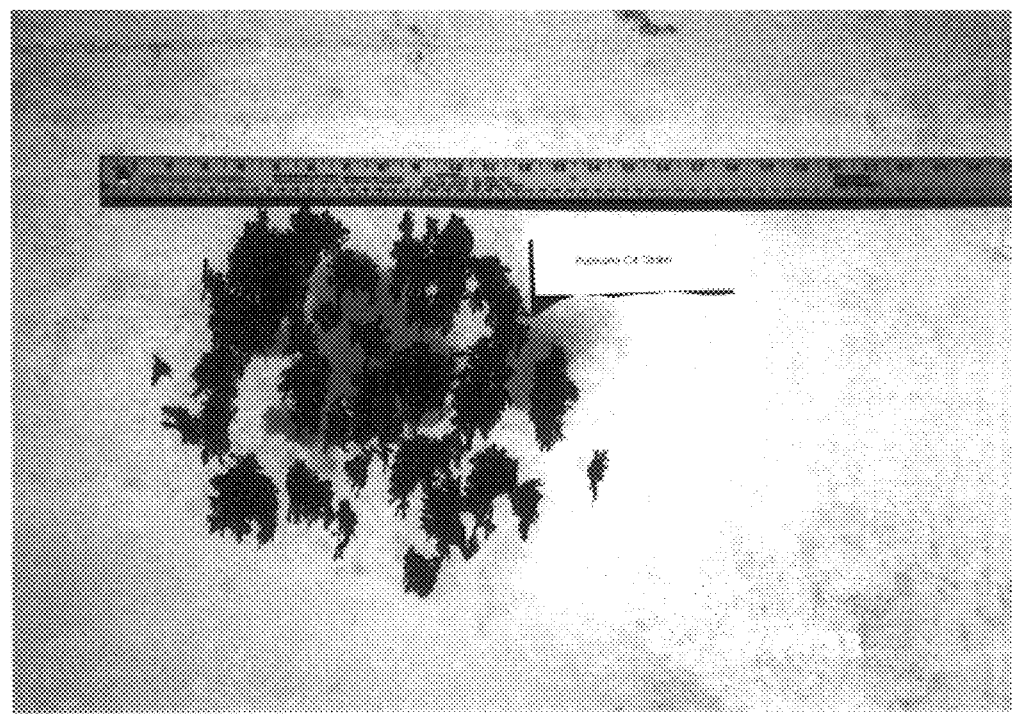
FIG. 2B is a photograph of Palmaria mollis "BIAC C-4" strain.

Palmaria cultivars of the present invention isolated to date generally have had a rosette morphology, rather than the leafy frond morphology of wild type *Palmaria mollis*. The present invention is not limited to Palmaria cultivars having a rosette morphology, as long as such non-rosette morphological cultivars have one or more of the other properties listed above, such as a growth rate greater than wild type *Palmaria mollis,* particularly when grown under working conditions at water temperatures of about 16° C. or greater. FIGS. 1 & 2 illustrate the rosette morphology of the subject cultivars. The rosette morphology is generally characterized by highly branched stipes and fronds measuring approximately 5 to 10 centimeters in length, and more typically 8 centimeters in length.

Preferred embodiments of the *Palmaria mollis* cultivars are reproductively sterile. Sterile cultivars are generally capable of perpetual culture without the deleterious effects of sporulation, such as withering, disintegration, death or destruction of the algal plants, and increased rates of genetic mutation and recombination (which may induce phenotypic changes not characteristic of the strain). Of course, sterility is not a necessary characteristic of these strains, since fertile strains may survive sporulation and not all genetic changes alter the strains' phenotypes that make them beneficial for, as an example, a food source. The strains of the present invention may be male sterile, female sterile, or both. Male sterility in Palmaria may be observed or detected with the naked eye, while detecting female sterility generally requires much closer scrutiny, such as with a microscope, since female gametophytes cannot readily be seen with the unaided eye (John P. Van der Meer and Edna R. Todd, *The life history of Palmaria palmata in culture, A new type for the Rhodophyta,* 58 CAN. J. BOT. 1250 (1980)).

Using methods similar to those described in Part III below, a particular *Palmaria mollis* strain, named "OSU C-3", was produced. Example 1 describes the specific protocol used to isolate this strain. "OSU C-3" has been deposited with the Culture Collection of Algae and Protozoa (CCAP), Institute of Freshwater Ecology, The Windermere Laboratory, United Kingdom. The CCAP allocated reference number 1378/1 to the "OSU C-3" strain when it received the initial sample for deposit.

Additional examples of *Palmaria mollis* having a rosette morphology include, but are not limited to, progeny strains derived from "OSU C-3," such as "BIAC C-3," and "BIAC C-3$_{GR}$." Examples 3 and 4, respectively, describe the isolation of these strains.

III. Methods for Isolating and Culturing Alga1 Strains

The present invention provides a method for isolating Palmaria cultivars generally, such as Palmaria cultivars having a growth rate greater than that of the wild type or known strains at temperatures above 16° C., including *Palmaria mollis* cultivars having a rosette morphology, rather than the wild type leafy morphology. Particular cultivars (described in Part II above) comprise members of the species *Palmaria mollis*. However, one of ordinary skill in the art will readily appreciate that the present invention encompasses other Palmaria species as well.

One embodiment of the method for isolating such *Palmaria mollis* cultivars involves first containing an alga source culture in a suitable container. Any container capable of holding or containing the alga may be used. The container may be an artificial container of any feasible size made out of suitable materials, such as metal, metal alloys, polymeric materials, such as plastic, glass, fiberglass, or Styrofoam®, and, of course, combinations of these materials. The container also may be a natural container, such as a pool, pond, tidepool or reservoir. The container is usually, though not necessarily, watertight. The spatial dimensions and volumes of containers useful for cultivating are determined by the environment in which the culture is placed, production requirements, and economic considerations. Small laboratories may use a small container that can be placed in the corner of a room or even on a tabletop, whereas a commercial aquaculture facility may use a much larger container, such as a pool or pond.

At least one algal source culture is placed in the container. The source culture may be obtained from a naturally occurring population of *Palmaria mollis* (such as a population growing in a coastal area), a population grown in an artificial environment (such as a population growing in a research facility), or other suitable population. The source culture may be the wild type *Palmaria mollis,* a naturally occurring strain, or an artificially induced strain. Each sample may comprise a single *Palmaria mollis* or population of *Palmaria mollis,* or any other collection of the alga capable of initiating a culture. Additionally, the source culture may comprise algae collected from the same or different geographic regions.

The minimum sample size of source culture necessary to initiate a culture of *Palmaria mollis* may vary with the size of the container used for culturing, or because of other considerations. Generally, however, the initiating sample size is from about 1 g to about 10 kg, and more typically 2 g to 1 kg.

Embodiments of the method of the present invention for isolating *Palmaria mollis* cultivars may produce reproductively sterile (i.e., non-fertile) cultivars. Selecting non-fertile samples as source cultures for isolating a *Palmaria mollis* strain of the present invention increases the likelihood that a sterile cultivar will be produced (since a non-fertile sample may be permanently sterile). Fertile *Palmaria mollis* cultivars can be recognized by the presence of gametophytes, particularly the male gametophytes, which are described in any discussion of the life history of Palmaria, such as John P. Van der Meer and Edna R. Todd, *The life history of Palmaria palmata in culture, A new type for the Rhodophyta*, 58 CAN. J. BOT. 1250 (1980). Such sterile cultivars offer the advantage of allowing perpetual culture without the deleterious effects of sporulation described above. However, embodiments of the present invention may comprise cultivars which are not sterile, or are male-sterile, female-sterile, or both.

Water flushing, generally seawater flushing, may be used to simulate actual marine conditions and/or control the amount of dissolved inorganic carbon and nutrients in the culture. Seawater flushing may be intermittent or continuous. Seawater exchange rates can be varied according to considerations such as the volume of the container, production or yield of Palmaria, nutrient demands of the Palmaria, and controlling pH fluctuations due to photosynthesis and/or respiration.

Preferred embodiments of the present invention used tumble culturing to isolate a *Palmaria mollis* strain having a rosette morphology. Tumble culturing is understood to mean a method of culturing where the source culture is placed in a container supplied with a submerged air source. The aeration rate and size of the container can be varied, but all tumble culture methods provide the benefit of more easily inducing the morphological changes leading to a desired phenotype, such as a rosette morphology.

Tumble culturing can be accomplished by a variety of means, including modifying a commercially available container, such as the Nalgene 110 liter container available from Nalge Nunc International, Corp., of Rochester, N.Y., USA. If tumble culturing is used, the rate of tumbling should be vigorous, such as a tumble culture rate greater than about 10 cm per second. The tumble culture rate refers to the relative velocity of the algae sample to the water, such as the rate of movement of the algae through the water.

Where tumble culture containers were used, the tumbling rate of the Palmaria preferably was from about 1 to about 20 cm/sec, and the tumbling rate preferably was vigorous, such as from about 6 cm/sec to about 10 cm/sec. Photosynthetic rates (yields) increase sharply above 5 cm per sec and show a positive linear relationship between about 5 and about 20 cm/sec. Practically, rates between about 6 and about 10 cm/sec were found to cover both the biological and economic needs of the culture.

Isolating an appropriate Palmaria strain having desired characteristics, such as enhanced growth rate and temperature tolerance relative to the wild type and/or a rosette morphology, is accomplished by altering the environmental conditions of the culture. Certain environmental elements, and combinations thereof, have been shown to favor the production and development of such Palmaria strains. These environmental elements include, but are not limited to: (1) vigorous tumbling; (2) high macro nutrient (nitrates and phosphates) levels, where "high" means a concentration greater than or equal to tissue saturation levels; (3) high levels of micro nutrients including chelated iron, zinc, copper, molybdenum and manganese; (4) minimal seawater flushing, such that the Palmaria strain is slightly starved for dissolved inorganic carbon, which preferably is kept in the range of from about 1.0 to about 1.5 mM; (5) artificial illumination, with our example being light having a strong ultraviolet (UV) component (e.g., light supplied by 1000 to 1500 watt metal halide or high pressure sodium bulbs); and (6) the capability to identify the morphological changes in the culture leading to the rosette morphology. Each of these elements is described in more detail below.

Nitrate concentration within the culturing system is maintained at a level of from about 1,765 $\mu$M to about 2,300 $\mu$M. Phosphate levels are maintained at a level of from about 83 $\mu$M to about 417 $\mu$M. Suitable sources of nitrates and phosphates include, but are not limited to, $NaNO_3$, $NH_4NO_3$, $NaH_2PO_4$, $NH_4SO_4$, $NH_4PO_4$, ammonium polyphosphates, and mixtures thereof.

Concentration of chelated iron within the culturing system is maintained in the range of from about 12 $\mu$M to about 24 $\mu$M. The concentration of zinc is maintained in the range of from about 0.15 $\mu$M to about 0.30 $\mu$M and the concentration of manganese is maintained in the range from about 0.90 $\mu$M to about 1.8 $\mu$M. Suitable sources of such chelated metals include, but are not limited to, EDTA chelated metals with a chelate to metal ratio of about 0.8 to 1.0., or the "f" enrichment medium as described in R. R. L. Guillard and J. H. Ryther, *Studies on marine plankton diatoms; I. Cyclothella nana Huntedt and Petorula confercacae* (*Cleve*), 8 GRAN. CAN. J. MICROBIOL. 229–239 (1962).

The culture also is starved for inorganic carbon. "Starved for inorganic carbon" generally means that the concentration of inorganic carbon generally is less than about 2.0 $\mu$M, and more typically from about 1.0 mM to about 1.5 mM.

Supplemental illumination also can be provided. Some embodiments of the present invention used 1,000 to 1,500-watt metal halide or high pressure sodium bulbs to produce supplemental illumination of from about 1,400 to about 1,700 mol photons per second per meter at the water surface under ambient light conditions of about 2,000 mol photons per second per meter at the illumination source. The amount of supplemental illumination can be reduced as ambient light conditions increase. Supplemental illumination can also include a strong UV component.

The environmental conditions of the culture also can be varied to select a *Palmaria mollis* cultivar useful for a particular purpose as opposed to having a particular physical characteristic such as for human consumption, abalone fodder, or co-culturing with abalone. Such environmental conditions include, but are not limited to, those environmental conditions described above. Additional environmental conditions also can be varied to achieve this goal. For example, the temperature of the culture during isolation can be altered to select for a cultivar capable of growing at a certain temperature. This could be used to select for a cultivar capable of co-culturing with a cultivar-foraging organism which exists only in such environments, or which thrives in such environments.

IV. Methods of Using the Palmaria Cultivars

The Palmaria cultivars of the present invention, such as the *Palmaria mollis* cultivars described in Part II above, have a number of uses. The cultivars provide an excellent food source for abalone because they are easy to cultivate and grow rapidly. For example, "OSU C-3" grown over a five-week period at temperatures of about 17° C. to about 18° C. produced a moderately high yield, of about 850 g/m$^2$/day, and specific growth rate of about 8.8% per day without experiencing tissue disintegration. In comparison, wild type Palmaria and known Palmaria strains grown at such temperatures have lower yields, a very small specific growth rate, of about 4% per day or less, and often exhibit tissue disintegration.

The nutritional quality of *Palmaria mollis* also makes it an excellent food source. *Palmaria mollis* in general is a highly nutritional food source for abalone, with a relatively high nutritional content compared to other macroalgae, such as bull kelp. Abalone grown on a diet of *Palmaria mollis* demonstrate superior growth characteristics compared to abalone grown on a diet of bull kelp (*N. luetkeana*). Table 1 illustrates the superiority of *Palmaria mollis* by comparing growth characteristics of juvenile red abalone fed diets of six different cultures of "Puget Sound" *Palmaria mollis* grown under different environmental conditions, compared to juvenile red abalone fed a traditional diet of bull kelp. Strains of the present invention offer the same nutritional quality and benefits of "Puget Sound"

$$FCE=100*(W_f-W_i)/(F_g-F_u)$$ Formula 2

With reference to Formula 2, $W_f$ was the final ash-free dry weight of abalone tissue, $W_i$ was the initial mean ash-free dry weight of tissue, $F_g$ was the ash-free dry weight of food given, and $F_u$ was the ash-free dry weight of food uneaten for the whole experimental period.

The daily feed consumption rate (DFC) was estimated as the ash-free dry weight of algae consumed per day, expressed as a percentage of the ash-free dry tissue weight of abalone, according to Formula 3 below.

$$DFC=(F-R)/(W*T)$$ Formula 3

With reference to Formula 3, F was the ash-free dry weight of feed offered over the experimental period, R was the

TABLE 1

| Diet | Survival (%) | SL Increase (μm d⁻¹) | SGR (% d⁻¹) Dry wt. | SGR (% d⁻¹) Wet wt. | FCE (%) Dry wt. | FCE (%) Wet wt. | DFC (%) Dry wt. | DFC (%) Wet wt. |
|---|---|---|---|---|---|---|---|---|
| 24 h 35× | 100 | 62.81 ± 3.49 a | 1.42 ± 0.07 a | 1.40 ± 0.08 a | 22.60 ± 0.66 a | 13.51 ± 0.59 cd | 5.68 ± 0.18 b | 10.64 ± 0.33 b |
| 24 h, 1× | 100 | 61.21 ± 2.56 a | 1.41 ± 0.04 a | 1.38 ± 0.04 ab | 18.68 ± 0.35 b | 24.90 ± 0.98 a | 6.83 ± 0.24 a | 5.70 ± 0.23 d |
| 24 h, 6× | 97.5 | 59.78 ± 5.03 ab | 1.33 ± 0.08 ab | 1.29 ± 0.07 ab | 19.60 ± 0.85 b | 15.15 ± 0.34 c | 6.06 ± 0.41 ab | 8.71 ± 0.60 c |
| 0 h, 6× | 100 | 56.22 ± 3.98 ab | 1.36 ± 0.03 ab | 1.33 ± 0.12 ab | 20.08 ± 1.66 b | 14.33 ± 0.41 d | 6.07 ± 0.59 ab | 9.49 ± 0.65 bc |
| 0 h, 35× | 100 | 54.60 ± 3.50 ab | 1.27 ± 0.09 ab | 1.22 ± 0.07 ab | 19.55 ± 0.93 b | 12.91 ± 0.35 d | 5.73 ± 0.34 b | 9.61 ± 0.62 bc |
| 0 h, 1× | 100 | 51.56 ± 3.49 b | 1.23 ± 0.10 b | 1.23 ± 0.12 b | 18.19 ± 0.53 b | 19.38 ± 1.30 b | 5.91 ± 0.46 b | 6.47 ± 0.51 d |
| N. luetkeana | 100 | 53.93 ± 4.04 ab | 1.19 ± 0.13 b | 1.17 ± 0.08 b | 19.21 ± 1.34 b | 6.25 ± 0.35 c | 5.42 ± 0.13 b | 19.00 ± 0.41 a |

*Palmaria mollis,* but offer the further advantages of higher growth rates and yields. Furthermore, strains of the present invention exhibiting the rosette morphology have fronds of a softer texture similar to kelps, such as giant and bull kelps.

Table 1 summarizes data for an 8-week (56 day) abalone growth trial. Measurements for abalone fed a diet of *N. leutkeana* are listed on the bottom row, while all other rows refer to measurements for abalone fed a diet of *Palmaria mollis* and indicate the number of hours of supplemental illumination (h), and number of seawater exchanges per day (x). The mean shell length (SL) increase is based on measurements, to the nearest 0.1 mm, of the length of abalone along their longest axes. Measurements of 30 to 40 abalone were taken on days 1 and 56. Specific growth rate (SGR), feed conversion efficiency (FCE), and daily feed consumption (DFC) are expressed as a mean percentage plus-or-minus one standard deviation for both ash-free dry and wet weights of food and abalone. Values followed by the same letter are not significantly different, based on a Tukey HSD test (P>0.05).

Initial wet weights were determined after blotting-dry the abalone. Four groups of 10 abalone, randomly sampled from the population used to determine SL increase, were initially weighed before day 1 to determine initial wet tissue weight, dry tissue weight, and ash-free dry tissue weight. Tissues were dried at 60° C. for twenty-four hours to determine dry weight. Dried abalone tissues were subsequently placed in a furnace for twenty-four hours at 420° C. for ash weight determination. Ash-free dry weights of tissue were calculated by subtracting ash weights from dry tissue weights. Final weights of abalone were calculated using the same procedures.

Specific growth rate (SGR), expressed as percent change in natural log of the ash-free dry weight per day, was calculated using Formula 1 below.

$$SGR=100*(lnW_f-lnW_i)/d$$ Formula 1

With reference to Formula 1, $W_f$ was the final mean ash-free dry weight of tissue, $W_i$ was the initial mean ash-free dry weight of tissue, and d was the experimental period in days.

Feed conversion efficiency (FCE), used as a measure of how efficiently the diet was used for growth, was calculated using Formula 2 below.

ash-free dry weight of remaining feed collected over the experimental period, W was the average weight of abalone (ash-free dry weight of tissue) over the experimental period, and T was the experimental period in days.

Figure 5:
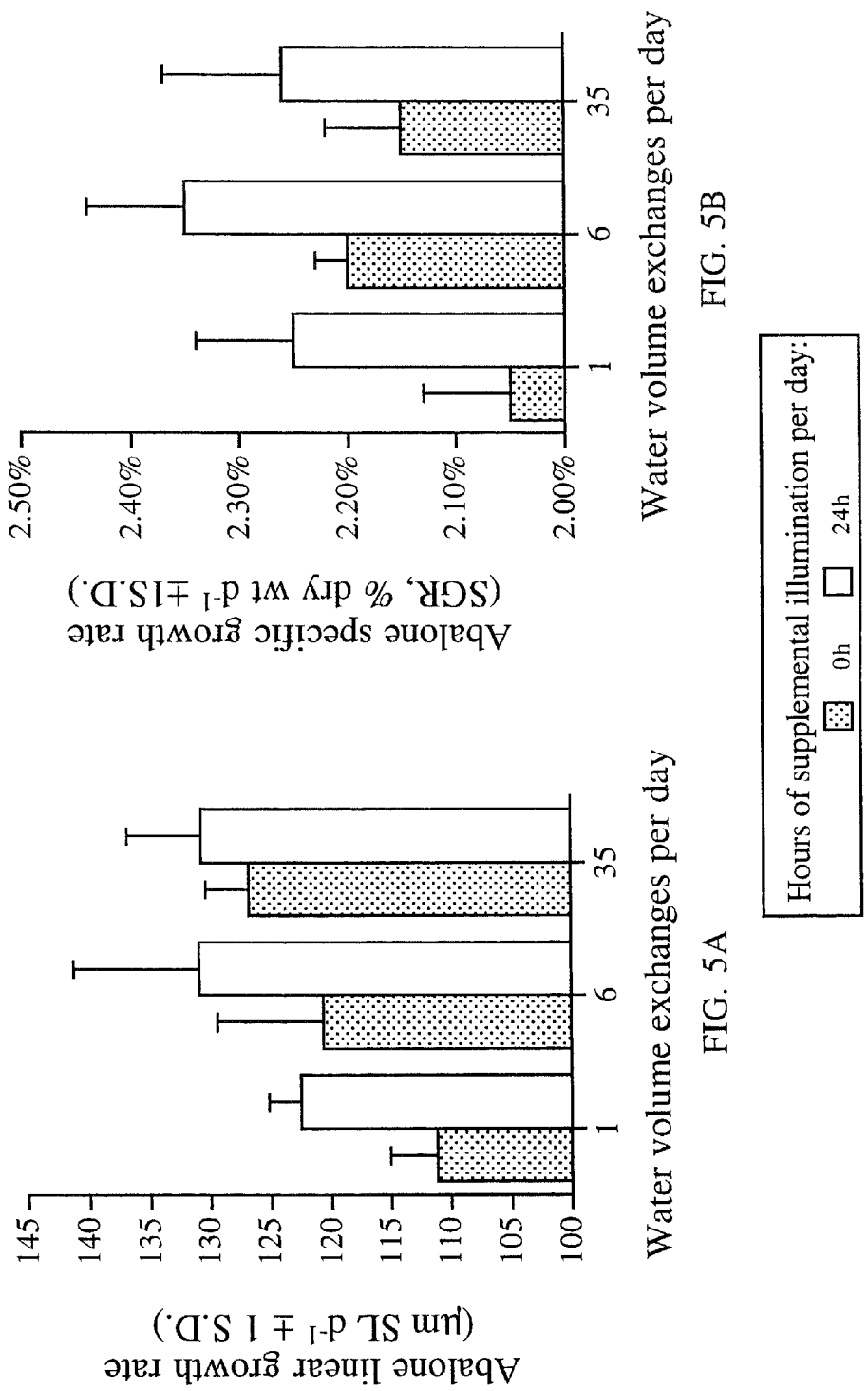
FIG. 5A is a graph showing abalone linear growth rates when fed a diet of "Puget Sound" *Palmaria mollis*.
FIG. 5B is a graph showing abalone abalone specific growth rates when fed a diet of "Puget Sound" *Palmaria mollis*.

FIGS. 5A–B also demonstrate the superior growth characteristics of abalone fed a diet of "Puget Sound" *Palmaria mollis*. FIG. 5A shows abalone linear growth rates, while FIG. 5B shows abalone specific growth rates. In FIGS. 5A–B, the abalone fed on the *Palmaria mollis* in a co-culturing system.

Table 2 summarizes growth data for abalone fed a diet of a presently claimed *Palmaria mollis* strain, the "OSU C-3" strain, in the same manner as the abalone fed a diet of the "Puget Sound" strain described in relation to Table 1. Four populations of abalone were measured, each population having 50 individual abalone. Measurements of individual abalone were taken on the specified days, and a grand mean was calculated based on the means of each of the four populations. Length refers to the mean shell length along the longitudinal axis of the abalone, while the weight refers to the whole body weight of the abalone measured after the abalone were blotted dry.

TABLE 2

| | Shell Length | | Whole animal wet weight | |
|---|---|---|---|---|
| Day in culture | Length (mm) | Standard Error | Weight (grams) | Standard Error |
| 0 | 28.15 | 0.57 | 4.07 | 0.22 |
| 31 | 34.85 | 0.68 | 6.67 | 0.34 |
| 59 | 41.65 | 0.60 | 11.08 | 0.51 |
| 86 | 47.15 | 0.66 | 16.89 | 0.66 |
| 119 | 52.37 | 1.09 | 22.73 | 0.81 |
| 150 | 54.59 | 0.86 | 25.60 | 1.00 |
| 178 | 56.94 | 1.27 | 28.47 | 1.45 |
| 213 | 60.56 | 1.41 | 35.42 | 2.21 |
| 249 | 63.80 | 1.33 | 45.35 | 2.79 |
| 289 | 67.06 | 1.33 | 53.23 | 2.60 |
| 322 | 70.68 | 1.51 | 58.89 | 6.81 |

Figures 6A, 6B:
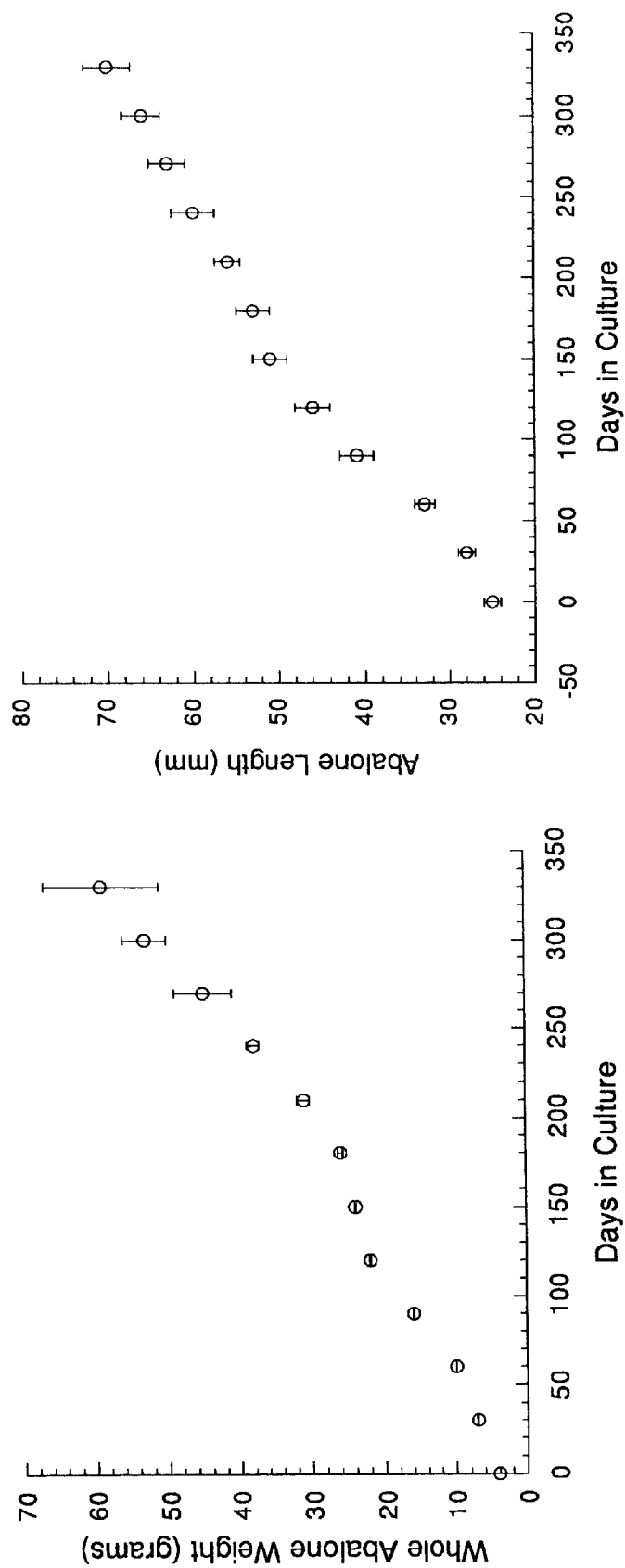
FIG. 6A is a graph showing an increase in abalone weight over time when fed a diet of "OSU C-3" *Palmaria mollis*.
FIG. 6B is a graph showing an increase in abalone length over time when fed a diet of "OSU C-3" *Palmaria mollis*.

The data of Table 2 is also presented graphically in FIGS. 6A–B.

Figure 7A:
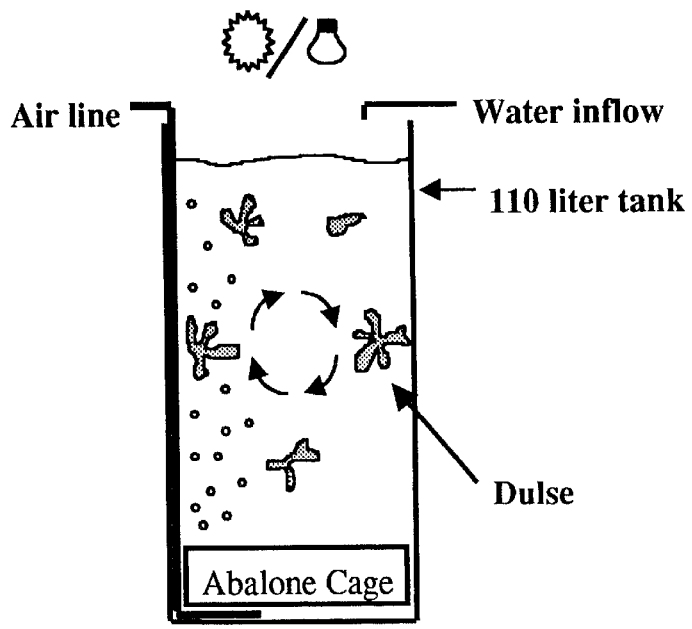
FIG. 7A illustrates one embodiment of an abalone/*Palmaria mollis* co-culturing system.
Figure 7B:
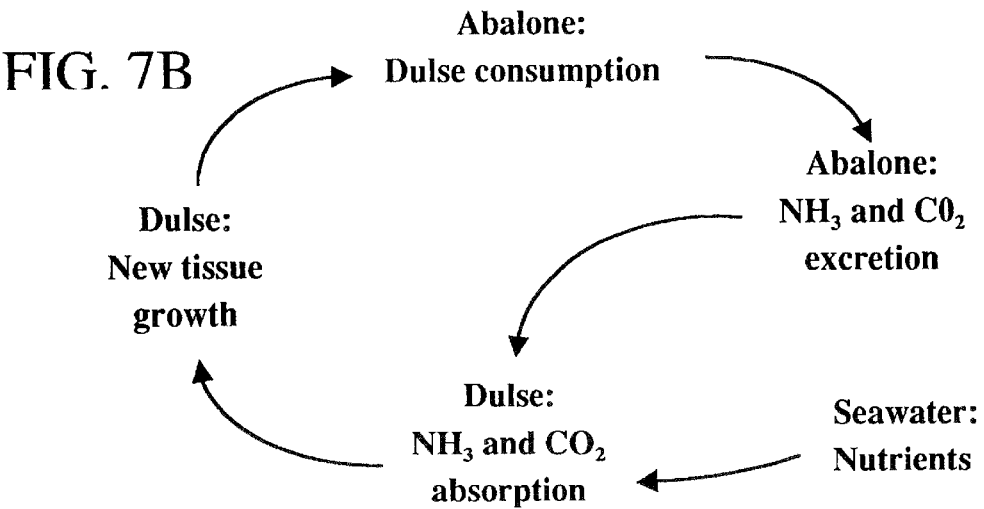
FIG. 7B illustrates the nutritional cycling of an abalone/*Palmaria mollis* co-culturing system.

Co-culturing *Palmaria mollis* and abalone provides aquaculture farmers with reliable supplies of nutritious abalone fodder while maintaining high water quality. Water quality is maintained through uptake by the *Palmaria mollis* of ammonia excreted by the abalone. Such a self-sustaining co-culture system allows abalone to consume *Palmaria mollis* and release both ammonia and carbon dioxide as waste, as illustrated by FIGS. 7A–B. In return, these abalone waste products are then absorbed by the *Palmaria mollis*, with inorganic carbon and nitrogen being assimilated into growing *Palmaria mollis* tissue.

*Palmaria mollis* strains of the present invention provide superior co-culturing characteristics compared to wild type and known strains of *Palmaria mollis*. The optimal temperature for growth of wild type and known strains of *Palmaria mollis* is about 12–14° C., with very little growth occurring above 15° C. and almost no growth occurring above 16° C. Strains of the present invention, however, are able to grow at temperatures above 16° C.

Additionally, due to their rosette morphologies and greater SA/V ratios, the strains of the present invention are more photosynthetically active (and thus grow faster) than the wild type and known strains of *Palmaria mollis*. *Palmaria mollis* strains of the present invention having a rosette morphology also have more surface area available for absorbing inorganic carbon and nitrogen.

The rosette morphology also makes the strains of the present invention more useful as human food. The tough, leathery fronds of wild type Palmaria species are not palatable when fresh but, if dried carefully and rapidly, can actually taste good. Because of their rosette morphologies and greater SA/V ratios, strains of the present invention can be dried much more rapidly (since greater surface area will allow more rapid evaporation) than wild type Palmaria, thus reducing processing time and processing expense, and are palatable when fresh.

V. Deposit Statement

The subject cultures (described in Part II above) have been deposited under conditions that assure access to the cultures will be available during the pendency of the patent applications disclosing them to one determined by the Commissioner of Patents and Trademarks to be entitled thereto under 37 C.F.R. § 1.14 and 35 U.S.C. § 122. However, it should be understood that the availability of a deposit does not constitute a license to practice the subject invention in derogation of patent rights granted by governmental action.

Further, the subject culture deposits will be stored and made available to the public in accord with the provisions of the Budapest Treaty for the Deposit of Microorganisms, (i.e., they will be stored with all the care necessary to keep them viable and uncontaminated for a period of at least five years after the most recent request for the furnishing of a sample of the deposits, and in any case, for a period of at least 30 (thirty) years after the date of deposit or for the enforceable life of any patent which my issue disclosing the cultures plus five years after the last request for a sample of the deposit). The depositor acknowledges the duty to replace the deposits should the depository be unable to furnish a sample when requested, due to the condition of the deposits. All restrictions on the availability to the public of the subject culture deposits will be irrevocably removed upon the granting of a patent disclosing them.

VI. Examples

The following examples are provided to illustrate particular features of the present invention. The scope of the present invention should not be limited to those features exemplified.

EXAMPLE 1

Isolation of *Palmaria mollis* "OSU C-3"

*Palmaria mollis* samples were collected in the vicinity of Monterey, CA. Only non-fertile algal plants were selected, thus increasing the likelihood of selecting for sterile strains. Over 40 kg of algal plants were transported to the Hatfield Marine Science Center (HMSC), Newport, Oreg., for culturing. The algal plants arrived at the HMSC as long, broad triangular-shaped fronds inappropriate for tumble culture; such fronds tend to become entangled and grow at a very low rate or even disintegrate.

These fronds were cultured under conditions intended to produce a morphological change in the alga from broad, triangular-shaped fronds to rosettes. The rosettes were tumbled at a rate of about 6 to 10 cm/sec. Macro nutrients (especially nitrates and phosphates) were maintained at high levels of about 1,765 $\mu$M and 83 $\mu$M respectively. Amounts of chelated iron, zinc and manganese were introduced into the culture system using the "f" enrichment medium to maintain concentrations of about 2.36 $\mu$M for chelated iron, 0.15 $\mu$M for zinc, and 1.82 $\mu$M for manganese. The "f" enrichment medium is described in R. R. L. Guillard and J. H. Ryther, *Studies on marine plankton diatoms; I. Cyclothella nana Huntedt and Petorula confercacae (Cleve)*, 8 GRAN. CAN. J. MICROBIOL. 229–239 (1962). Minimal seawater flushing (of less than about 6 volume exchanges per day, and more typically less than about 3 volume exchanges per day) was employed to keep the *Palmaria mollis* slightly starved for dissolved inorganic carbon, which was kept in the range of from about 1.0 to about 1.5 mM. Strong ultraviolet (UV) radiation was supplied by metal halide, or high-pressure sodium light bulbs, from about 1,000 W to about 1,500 W.

The culture was carefully observed for morphological changes. Selected cultivars were labeled the "OSU C-2" strain. These cultivars produced broad thalli of about 2–9 cm in width and about 10–20 cm in length. The "OSU C-2" strain was cultivated under the same conditions for 43 days. A strain mutant, exhibiting a much finer rosette morphotype, was observed growing at the thallus base of a leafy "OSU C-2" strain plant. This mutant was isolated, labeled the "OSU C-3" strain, and immediately placed in containers for culture expansion. Approximately 6 weeks later, enough of the strain had been cultured to test its growth rate.

The "OSU C-3" strain exhibited a high surface-area-to-volume ratio (SA/V), of about 25 $cm^2/cm^3$, thus inducing a high photosynthetic rate per unit weight. It was predicted that this high photosynthetic rate per unit weight would correlate to a high growth rate. "OSU C-3" cultivars were cultured for two weeks under high light intensities (of about 1600 mol photons per second per meter at the water surface) alongside other algae strains developed at the HMSC.

From the start of this cultivation, it was observed that "OSU C-3" was far less susceptible to fouling by other epiphytic micro-algae. "OSU C-3" also had a higher growth rate than the other strains tested. Furthermore, "OSU C-3" was apparently sterile showing no evidence of being fertile, a characteristic common for the other strains being cultured and tested at the time.

EXAMPLE 2

Culture Trials of "OSU C-3"

Samples of the "OSU C-3" strain were transported to the Big Island Abalone Corporation (BIAC) in Kailua-Kona, Hi, for field testing. In one five-week experiment, "OSU C-3" grown at temperatures of about 17–18° C. and salinity of about 31–32 parts per thousand produced a moderately high yield of about 851 g / m² / d with a specific growth rate (SGR) of about 8.8% per day. In comparison, wild type Palmaria and known Palmaria strains would not have had such a high growth rate. In fact, wild type and known strains of Palmaria would have exhibited little growth at all and would have exhibited some tissue disintegration.

Additionally, the ambient conditions (i.e., high light conditions and fluctuating water temperatures) of this trial should have produced a fertile *Palmaria mollis* strain. Surprisingly, "OSU C-3" showed no signs of becoming fertile and appeared to be a sterile male mutant.

EXAMPLE 3

Growth of "BIAC C-3"

The "OSU C-3" strain of Example 2 remained at BIAC and was relabeled "BIAC C-3". The "BIAC C-3" strain was grown under similar environmental conditions as described in Example 2 for a period of nine months. Ambient light levels were slightly higher, and salinity was about 35 parts per thousand, but temperature, nutrient levels, and seawater flushing rates were kept the same as in Example 2. During this nine month period, the "BIAC C-3" strain increased in biomass from the original 20 grams (first transported from the HMSC to BIAC) to over 20,000 kg.

EXAMPLE 4

Isolation of "BIAC C-3$_{GR}$"

Figure 8:
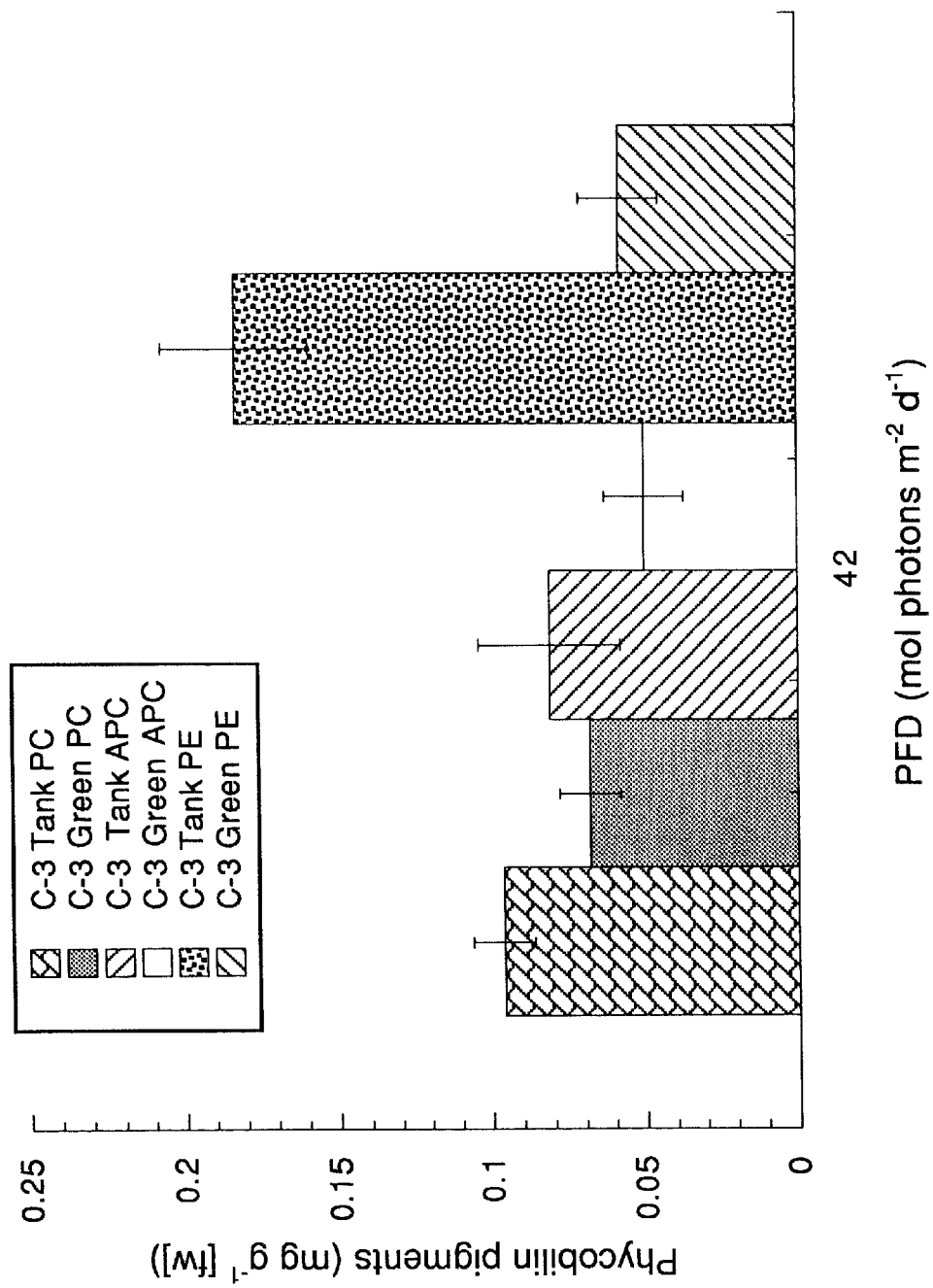
FIG. 8 is a graph showing differences in phycobilin pigmentation between the "OSU C-3" strain and the "BIAC C-$3_{GR}$" strain.

During a selection harvest of "BIAC C-3" under very high light exposures of about 2,600 mol photons per second per square meter at the water surface, a green mutant was observed growing at the thallus base of a "BIAC C-3" algal plant. The thallus blades of this mutant were virtually identical to the parent plant, except for the color. The green color apparently resulted from a lack of phycobilin (red) pigments, particularly phycoerythrin. This mutant was collected, labeled the "BIAC C-3$_{GR}$" strain, and placed in 125 L vessels for culture expansion. The "BIAC C-3$_{GR}$" strain appeared to have a slightly lower growth rate than "OSU C-3", probably due to pigmentation differences. FIG. 8 demonstrates the difference in phycobilin pigment concentrations between the "OSU C-3"(labeled C-3$^{Tanks}$ in the figure) and the "OSU C-3$_{GR}$" strain (labeled "C-3$^{Green}$" in the figure). Three particular phycobilin pigments are shown: phycocyanin (PC), allowophycocyanin (APC), and phycorythnin (PE).

While the present invention is described above in connection with at least one preferred embodiment, it will be readily understood that the scope of the present invention is not intended to be limited to this preferred embodiment. Instead, this description is intended to cover all alternatives, modifications, and equivalents that may be included within the spirit and scope of the invention as defined by the claims.

We claim:

1. An isolated *Palmaria mollis* strain that, when grown at a temperature of about 16° C. or higher, has a specific growth rate greater than wild type *Palmaria mollis* when the wild type *Palmaria mollis* is grown at the same temperature as the isolated strain of about 16° C. or higher.

2. The isolated *Palmaria mollis* strain according to claim 1 having a specific growth rate of at least 8 percent per day.

3. The isolated *Palmaria mollis* strain according to claim 2 having a specific growth rate of at least 11 percent per day.

4. The isolated *Palmaria mollis* strain according to claim 1 having a rosette morphology.

5. The isolated *Palmaria mollis* strain according to claim 1 which can be co-cultured with abalone.

6. An isolated *Palmaria mollis* strain that grows at least about 850 g/m²/day at a temperature of about 16° C. or higher.

7. The *Palmaria mollis* strain according to claim 6 which grows at a temperature of about 17° C. to about 18° C.

8. The isolated *Palmaria mollis* strain according to claim 1 where the specific growth rate is determined using the formula $SGR=100*(lnW_f-lnW_i)/d$, where $W_f$ is the final mean ash-free dry weight of tissue, $W_i$ is the initial mean ash-free dry weight of tissue, and is the experimental period in days.

9. The isolated *Palmaria mollis* strain according to claim 1 where the *Palmaria mollis* is grown under working conditions.

10. The *Palmaria mollis* strain according to claim 9 where working conditions are selected from the group consisting of moderate light of about 50 to about 55 mol photons per square meter per day at the water surface; sufficient amounts of macro and micro nutrients, such that the algae are not starved for nutrients; a sufficient amount of inorganic carbon, such that the algae are not starved for inorganic carbon; a stocking density of about 8 grams per liter; and combinations thereof.

11. The isolated *Palmaria mollis* strain according to claim 1 where the *Palmaria mollis* is sterile.

12. The *Palmaria mollis* strain according to claim 11 where the *Palmaria mollis* strain is male-sterile.

13. The isolated *Palmaria mollis* strain according to claim 1 where the strain is *Palmaria mollis* OSU C-3 deposited with the CCAP under their reference number 1378/1.

14. A method of feeding an organism, comprising:
providing the *Palmaria mollis* "OSU C-3" strain according to claim 13; and
feeding the isolated *Palmaria mollis* strain to an organism.

15. The method according to claim 14 where the organism is abalone.

16. The method according to claim 15 where the isolated *Palmaria mollis* strain is co-cultured with the abalone.

17. *Palmaria mollis* OSU C-3 strain that, when grown at a temperature of about 16° C. or higher, has a specific growth rate greater than wild type *Palmaria mollis* when grown at a temperature of about 16° C. or higher.

* * * * *